United States Patent

[11] 3,575,168

[72] Inventors Wilfred Jones
 Riddlesden, Keighley;
 Ronald William Carter, Keighley, England
[21] Appl. No. 779,791
[22] Filed Nov. 29, 1968
[45] Patented Apr. 20, 1971
[73] Assignee Cyprane Limited
 Yorkshire, England
[32] Priority Nov. 29, 1967
[33] Great Britain
[31] 54242/67

[54] VOLATILE ANAESTHETIC VAPORISING APPARATUS
2 Claims, 1 Drawing Fig.
[52] U.S. Cl. .................................................. 128/188
[51] Int. Cl. ................................................... A61m 17/00
[50] Field of Search .......................................... 128/188,
 186, 187, 189, 192, 196—197, 203, 210;
 137/625.19, 625.29, 625.30, 625.31;
 251/149.3—.8, 160, 180, 182, 192, 208; 261/63,
 (Vap. Digest); 55/(Inquired); /

[56] References Cited
UNITED STATES PATENTS
2,911,008 11/1959 Du Bois ........................ 137/625.31
3,192,924 7/1965 Edmondson et al. ......... 128/188

Primary Examiner—Richard A. Gaudet
Assistant Examiner—J. B. Mitchell
Attorney—Pierce, Scheffler & Parker ABSTRACT: A volatile anesthetic vaporizing apparatus including a rotary percentage control plate valve for controlling two divided inflowing gas streams, one stream being passed over liquid volatile anesthetic to form a vapor and the other bypassed through a duct controlled by a temperature responsive bypass valve, said plate valve also controlling the outflow of gas-vapor mixture, said bypass valve having a resistance characteristic which is inconstant.

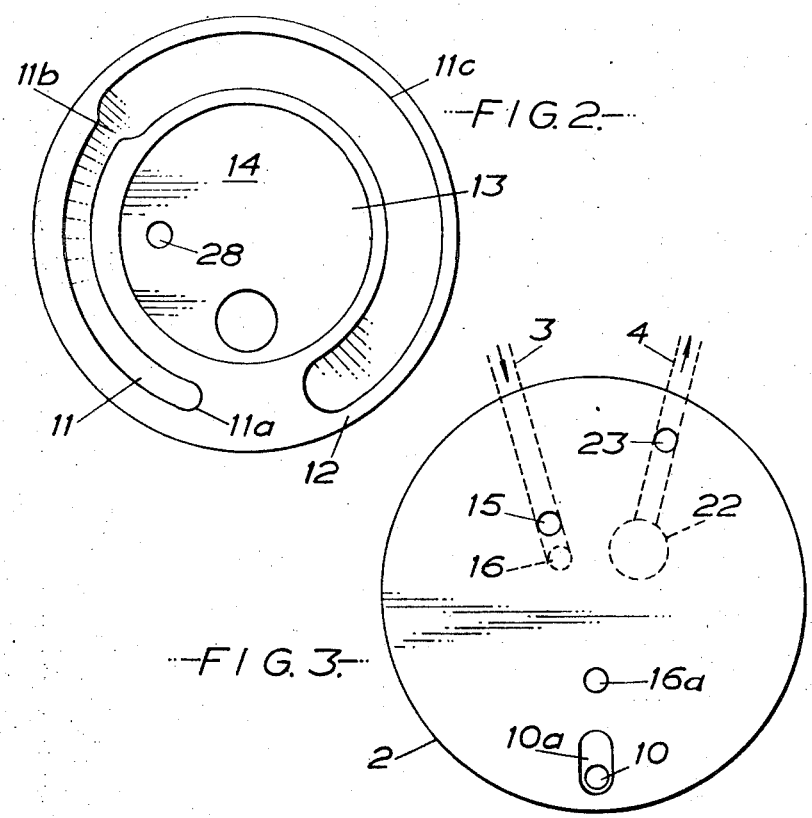
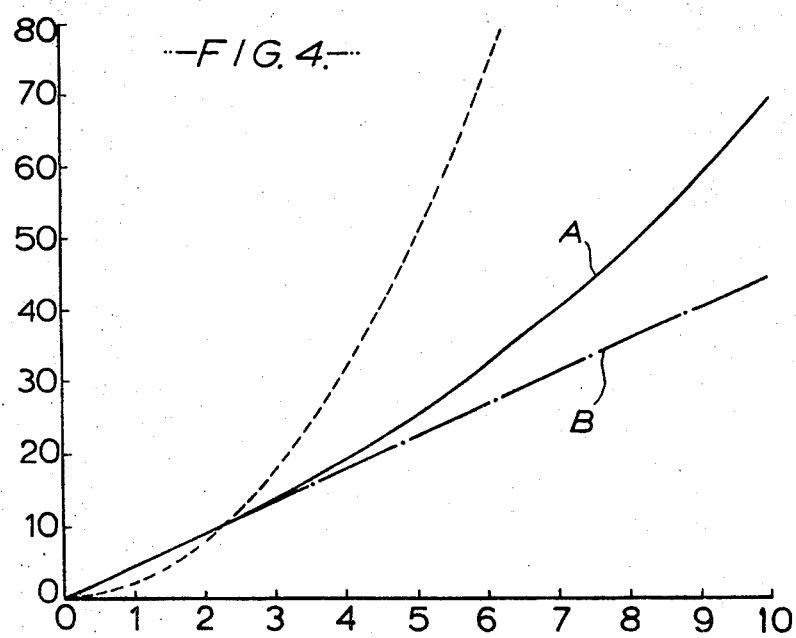

VOLATILE ANAESTHETIC VAPORISING APPARATUS

This invention relates to apparatus capable of mixing the vapor of a volatile liquid anesthetic with a gaseous fluid, such as air, oxygen, or nitrous oxide, or a combination thereof, all three of which for convenience are hereinafter included in the term "gas." The invention particularly relates to the bypass type of anesthetic vaporizer where the gas input to the vaporizer is divided into two streams which subsequently recombine. One stream passes through a bypass circuit and the other stream passes through a vaporizing chamber where the gas flow becomes mixed with the vapor from a volatile anesthetic. Control valves are incorporated in these two streams which may be adjustable to vary the final concentration of vapor obtained.

It is well known that the delivered concentration at different flows with the same control settings may vary for many reasons, some of which are as follows:

a. As the input flow to the vaporizer is increased, the flow through the valve on the bypass stream increases at a different rate to the flow through the valve on the stream which passes through the vaporization chamber.
b. The vapors of volatile anesthetic liquids are in general heavier than the carrier gases and this imposes an extra loading in the vaporization stream.
c. The proportion of anesthetic agent in the gas flowing out of the vaporizing chamber may change as the input flow of gas to the chamber changes due to such causes as cooling at the vaporizing surfaces, or drying out of the wicks (if fitted) and changes in gas distribution in the vaporizing chamber.
d. Resistance to flow due to ducting and other restrictions at positions other than the control valves may upset the performance.

Difficulty (a) can be removed by making the valves so that the ratio of the flows of gas through the two streams previously referred to is independent of flow. This can be done by having a valve system so that for each valve the first differential of pressure with reference to flow (the resistance characteristic) is independent of flow, i.e., the flow is streamline, or laminar, and $$\frac{dp}{dV} = \text{constant}$$

This does not, however, help remove difficulties (b), (c) and (d) above and if streamline flow is used for both control valves the delivered concentration will fall as the flow increases. This will be particularly noticeable at high concentrations. According to the present invention we provide volatile anesthetic vaporizing apparatus of the bypass type wherein the gas input is divided into a first stream passing through a vaporizing chamber to become mixed with vapor from a volatile anesthetic, and a second stream, the two streams subsequently recombining, in which the first stream is controlled by a percentage control valve and the second stream is controlled by a bypass valve responsive to the internal temperature of the vaporizer in such a way that the pressure drop over the bypass valve increases as the total volume of gas flow through the vaporizer increases.

Thus the resistance characteristic, dp/dV, is not constant and the bypass valve does not give streamline flow, the degree of deviation from streamline characteristics being dependent on the internal temperature of the vaporizer. When total gas flow into the vaporizer increases, the amount of gas flowing over the anesthetic increases and thus the rate of evaporation increases and the temperature drops. This temperature drop acts to further restrict the bypass valve so that the pressure drop over this increases and the gas flow through it decreases. Thus more gas is allowed to flow in to the vaporizing chamber than would otherwise be the case, and the anesthetic concentration in the recombined stream can be held substantially constant.

The percentage control valve may be made to have either streamline or nonstreamline characteristics. Desirably however the valve is designed to have different characteristics for different calibrated positions, because the relative importance of effects (b), (c) and (d) above are different at different output concentrations. The degree of deviation from streamline flow characteristics for any particular setting will usually be somewhere between that of the bypass valve and that for streamline flow, although the percentage control valve could be made more nonstreamline than the bypass valve at certain settings if it were necessary for any reason.

The invention will now be more particularly described with reference to the accompanying drawings, in which:

FIG. 2 is a plan view from below of a facing part of a control valve;

FIG. 3 is a plan view from above of the seating face of which the facing part is superposed, also showing in broken lines the outline of the superposed facing part with raised areas of this shown in broken line shading; and FIG. 4 is a graph showing flow characteristics.

Figure 1:
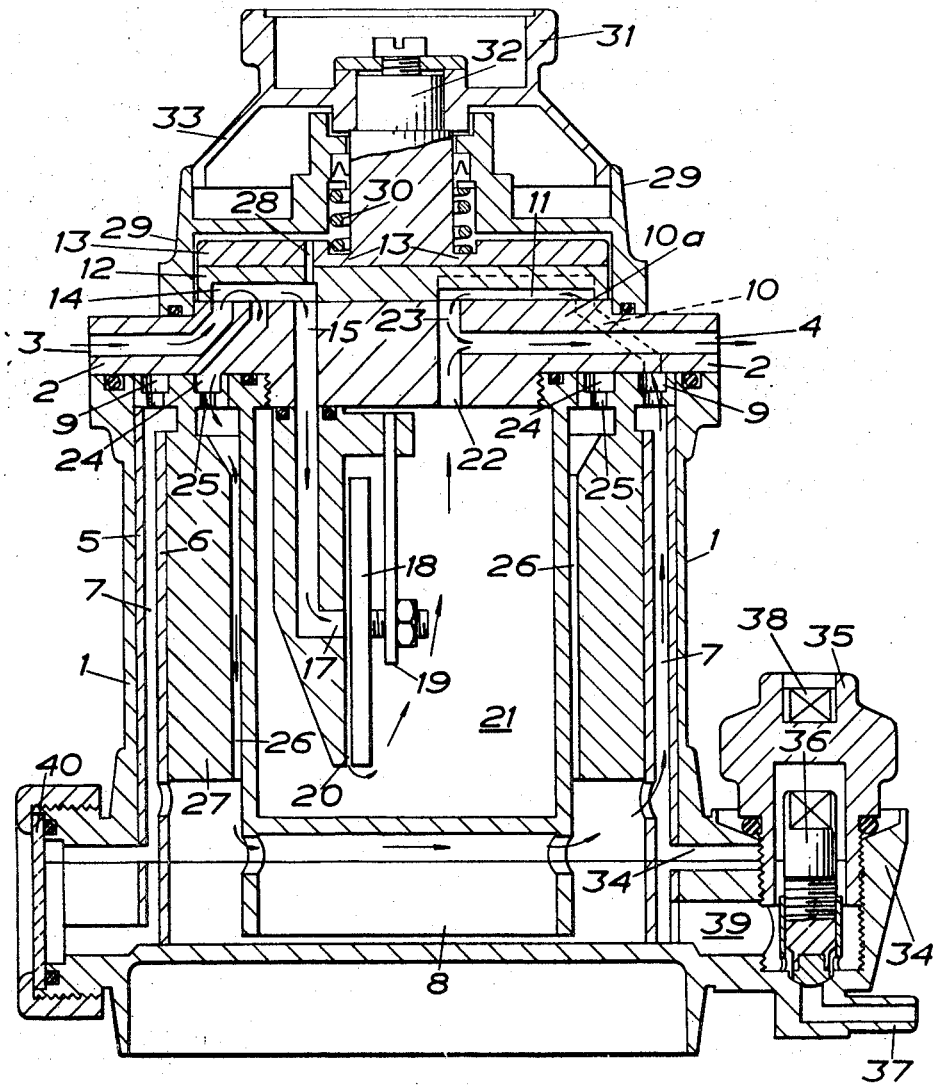
FIG. 1 is a sectional elevation generally on line I–I of FIG. 3 but partly in diagrammatic form for ease of description of the improved anesthetic vaporizer.

The vaporizer includes a body casing 1 closed at its lower end and furnished with a removable top closure plate 2 which is furnished with a gas inlet 3 and a gas mixture outlet 4. For the sake of convenience the inlet 3 and outlet 4 are shown as extending radially in FIG. 1, but their true directions are offset from the radial as shown in FIG. 3. A pair of cylindrical wicks 5, 6 dip into anesthetic within the casing and are arranged in the casing in spaced relationship to form an annular passage 7 for the upflow of gas vapor from the liquid anesthetic 8 in the base of the casing. This uprising vapor enters an annular groove 9 from which a passage 10 leads through the top plate 2. This passage 10 (FIG. 3) opens into the seating face of the top plate to register with an almost completely annular groove 11 in the facing part 12 of the valve 13. This facing part 12 may if desired be made of some form of so-called nonstick material such as polytetrafluoroethylene, which may be loaded with a strength material such as glass fiber. This form of material may mitigate sticking of the valve on the seating face which can be caused by certain constituents such as Thymol, in volatile anesthetic. This groove 11 is of a narrow width from its front end 11a to an intermediate point 11b and in this part the groove gets steadily deeper towards such part 11b. The groove then widens for the part 11c which is of even depth. The said groove formation may be changed to suit other volatile anesthetics and may be of constant width, or change more than once in width. A further recess 14 is formed in the valve part 12 to form a communication between a part 16 from the inlet 3, and a down passage 16a (FIG. 3). At the entry to port 16 the inflowing gas is divided into two streams, the other stream passing down a passage 15 into bypass system including a port 17 controlled by a valve 18 which in turn is operated by a bimetallic strip acting to increase the valve opening with increasing temperature and to reduce the valve opening with decreasing temperature. This gas stream emerges through a restricted passage 20 into a chamber 21 located axially within the body casing 1. There is an outlet 22 from this chamber which joins the vapor outlet 4 for gas to flow from said chamber and combine with vapor flowing up the passage 7 and 10 into the groove 11 in the valve and from there through a port 23 in the plate 2 to the outlet 4. The other down passage 16a from the valve facing recess 14 leads into annular groove 24 in the top of the body casing 1 and this communicates by a series of holes 25 with a very narrow annular passage 26 for gas to flow theredown on to the surface of the liquid anesthetic 8. This narrow passage 26 and the position and shape of the wall of chamber 21 tends to cause the downflowing gas to impinge on the surface of the anesthetic liquid and causes a certain amount of vapor to be picked up by the gas stream so that the amount of vapor to be picked up further along the gas stream is reduced, as is the thermal load on the wicks 5 and 6. This vapor as before stated flows up the annular passage 7 where further vaporization of anesthetic from the soaked wicks occurs to escape through the outlet 4 with gas which flows up from the chamber 21. The restricted annular passage 26 lies between the wall of the chamber 21 and an annular makeup piece 27 which is used to combine with the chamber 21 and wicks 5 and 6 to reduce the volume of gas within the body casing 1 for vaporization purposes. An escape hole 28 is provided through the valve for gas to pass from the recess 14 to the top side of the valve and so balance the pressure on the two surfaces of the valve 13.

The aforesaid valve 13 is located within an annular guide part 29 secured on top of the plate 2 and a spring 30 holds the valve facing 12 down on to the seating face of the top plate. The valve is rotated from an off position, wherein parts 10 and 16a are closed by valve facing 12, by a knob 31 secured on the stem 32 of the valve and this control knob has a tapering annular scale 33 which is graduated to requirements. In operation when the knob is rotated gas will be allowed to flow from the inlet 3 into the recess 14 from the inlet 3 down the bypass system into the chamber 21 through the valve controlled port 17 to pass up to the outlet 4 whilst another stream of gas will be passing down the restricted annular passage 26 to cause vaporization for vapor to flow up to the groove 11 in the valve facing and from thence become combined with the bypass stream of gas.

For control purposes the groove 11 in the valve facing 12 is made wide in relation to its depth so that the cross-sectional area of the groove is small in relation to the skin surface of the groove. For example, at low percentage settings the groove 11 may be about 0.2 inch wide and about 0.002 inch deep giving an area of about 0.0004 square inch.

The aforesaid body casing 1 is provided with a funnellike filler part 34 for the entry of liquid anesthetic and this inlet is closed by a headed stopper 35 which surrounds the head of a drain screw 36 which closes the drainage outlet 37. The stopper 35 is provided with a socket 38 in its head so that the stopper can be pulled out, inverted on to the head of a drain screw 36 which can then be screwed back for draining liquid anesthetic from the body casing 1 through passageway 39 and out through the outlet 37. There is an observation window 40 through the base part of the body casing 1 for observing the level of the liquid 8.

FIG. 4 illustrates graphically how the bypass system, Line A, varies from the streamline flow B, the vertical scale indicating pressure drop over the bypass valve 18 in centimeters water gauge and the horizontal scale indicates gas flow in liters per minute. It will be seen that the pressure drop over valve 18 increases as the gas flow increases.

It is usual to assist a patient's breathing by the use of a pumping device but this normally causes a positive and negative pressure in the gas circuit and a vaporizer so pushing a volume of air into and out of the vaporization chamber. The air so pushed becomes further enriched with anesthetic and so adversely affects the accuracy of control. This invention, by reducing the volume of gas above the liquid 8 as aforesaid, reduces this enrichment effect to a stage where it may be virtually negligible.

We have previously indicated that the rotary valve 13 when positioned at one extreme of its range of movement causes both passages connecting with the vaporizing chamber to be closed so that all the gas flows through the bypass system. By choice of an appropriate shape of the central recess 14, and by the provision of extra passages if necessary, it is possible for the rotary valve to provide other functions such as closing the bypass circuit to allow all the gas to flow through the vaporizing chamber, or providing a bleed to atmosphere for excess anesthetic vapor or providing a direct link between the inlet to and outlet from the vaporizing chamber.

We claim:

1. Vaporizing apparatus for a volatile anesthetic including;
   a body forming a container for liquid anesthetic and wherein such liquid can be vaporized by the inflow of gas;
   a bypass chamber for gas located above said container;
   a main inlet to, and a main outlet from, said bypass chamber for the through flow of gas;
   a bypass valve controlling the flow of gas into the bypass chamber;
   a temperature-responsive element connected to move said bypass valve to increase the pressure drop over the bypass valve as the temperature falls;
   a gas inlet to, and a gas-anesthetic outlet from, said container;
   gas inlet passage means for connecting said main inlet to said container gas inlet;
   gas-anesthetic outlet passage means for connecting said container gas-anesthetic outlet to said main outlet to mix with gas passing from said container;
   a rotary plate valve normally closing said gas inlet and gas-anesthetic outlet passages;
   means on said plate valve for opening said gas inlet passage throughout a set range of angular movement of said plate valve;
   part-annular groove means on said plate valve for opening said gas-anesthetic outlet passage over a further range of angular movement of said plate valve, said groove means having its depth less than its width;
   presenting a gas-anesthetic flow path along an arch of at least 180° and being of inconstant cross-sectional area to vary the flow of gas-anesthetic into the main outlet and thus vary the anesthetic concentration delivered from the vaporizer; and
   manual operating means for causing rotation of said valve to initially allow gas flow into the vaporizer and then to control the anesthetic concentration delivered from the vaporizer.

2. Vaporizing apparatus according to claim 1 wherein said plate valve has a valving surface in which said groove means is formed, said valving surface being comprised by a material having a low coefficient of friction and resistant to volatile anesthetic constituents, and wherein said bypass chamber has a removable cover against which said valving surface bears.